United States Patent [19]

Suzuki

[11] Patent Number: 4,559,446

[45] Date of Patent: Dec. 17, 1985

[54] FOCUS DETECTING SYSTEM USING LIGHT FROM AN IMAGING OPTICAL SYSTEM FOR FOCUS DETECTION

[75] Inventor: Kenji Suzuki, Kawasaki, Japan

[73] Assignee: Canon Kabushiki Kaisha, Tokyo, Japan

[21] Appl. No.: 464,578

[22] Filed: Feb. 7, 1983

[30] Foreign Application Priority Data

Feb. 18, 1982 [JP] Japan ............................... 57-23615
Dec. 11, 1982 [JP] Japan ............................... 57-217468

[51] Int. Cl.$^4$ .............................................. G01J 1/20
[52] U.S. Cl. .................................... 250/204; 250/201; 354/408
[58] Field of Search ............... 250/201, 204, 208, 209, 250/578; 354/402, 408, 409; 356/4

[56] References Cited

U.S. PATENT DOCUMENTS

| 4,047,022 | 9/1977 | Holle ............................... 250/201 |
| 4,185,191 | 1/1980 | Stauffer ........................... 250/204 |
| 4,230,401 | 10/1980 | Tokutomi et al. . | |
| 4,250,376 | 2/1981 | Joseph et al. ................... 250/204 |
| 4,297,571 | 10/1981 | Utagawa et al. ................ 250/201 |
| 4,336,450 | 6/1982 | Utagawa et al. ................ 250/204 |

Primary Examiner—Edward P. Westin
Attorney, Agent, or Firm—Fitzpatrick, Cella, Harper & Scinto

[57] ABSTRACT

Disclosed is a focus detecting system in which the exit pupil of an imaging optical system is divided into a plurality of exit pupils by an optical device, a plurality of object images are formed by light beams passed through the divided exit pupils, photoelectric conversion element arrays each comprising a plurality of elements and putting out signals corresponding to the imaged states of the object images are disposed at locations whereat the object images are formed, and the relative positional relation between the object images is found by a signal processing operation cirucit by the use of the output signals from the photoelectric conversion element arrays, the minimum or maximum of such signals being processed, whereby the state of focus of the imaging optical system is discriminated.

13 Claims, 12 Drawing Figures

FOCUS DETECTING SYSTEM USING LIGHT FROM AN IMAGING OPTICAL SYSTEM FOR FOCUS DETECTION

BACKGROUND OF THE INVENTION

1. Field of the Invention

This invention relates to a focus detecting system in an optical device such as a camera, and more particularly to a focus detecting system which uses the imaging light beam from an imaging optical system in, e.g., a single lens reflex camera, to effect focus detection.

2. Description of the Prior Art

As a focus detecting system of a camera, there is known one in which the exit pupil of the imaging optical system is divided into two and the amount of deviation is observed from the relative positional relation between two object images formed by the light beams passed through the divided exit pupils, whereby the state of focus is discriminated. For example, a system in which a fly-eye lens group is disposed on the predetermined imaging plane (image-forming plane) of the imaging optical system of a camera and two deviated object images are created correspondingly to the amount of defocus of the imaging optical system is disclosed in U.S. Pat. No. 4,185,191. Also, so-called secondary imaging process in which the object images of aerial images formed on the predetermined imaging plane by two juxtaposed secondary imaging systems are directed to a solid state image sensor surface to detect the relative positional deviation of the object images is disclosed in Japanese Laid-open Patent Application Nos. 118019/1980 and 155331/1980. The latter, i.e., the secondary imaging process has the advantage that it requires no special optical system, although the full length of the optical system thereof is somewhat great.

Figure 1:
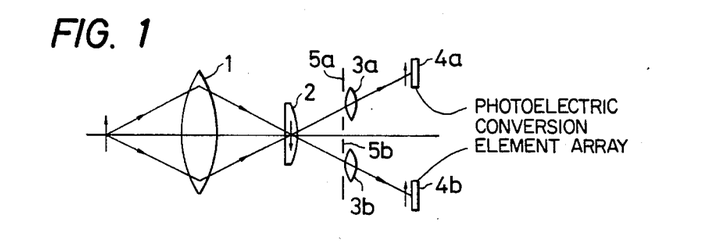
FIG. 1 illustrates the principle of a focus detecting system using the secondary imaging system.
Figure 2A:
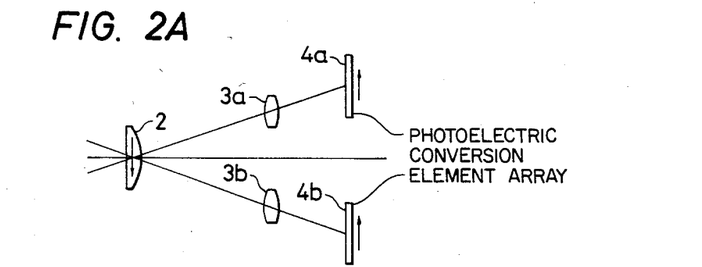
FIGS. 2A-2C illustrate the principle of image deviation.
Figure 2B:
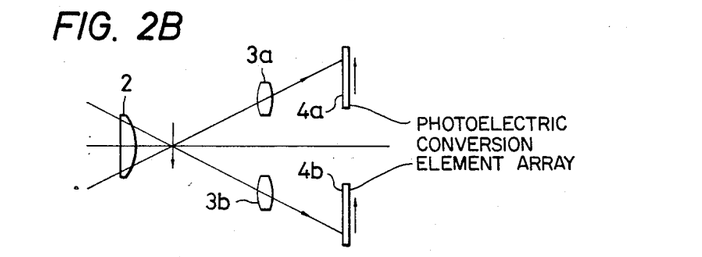
Figure 2C:
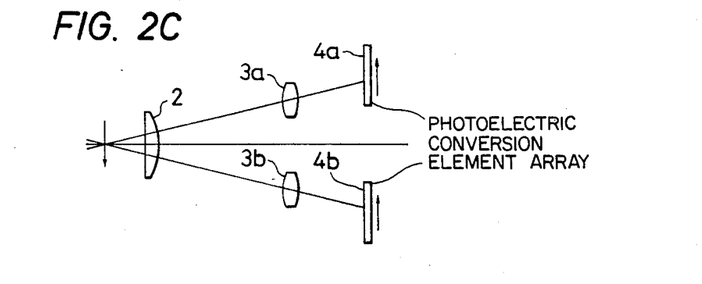

The principle of the focus detecting device of the secondary imaging process will hereinafter be described briefly by reference to FIG. 1 of the accompanying drawings. A field lens 2 has the same optical axis as an imaging optical system 1, and two secondary imaging lenses 3a and 3b are juxtaposed rearwardly of these, and photoelectric conversion element arrays 4a and 4b are further disposed rearwardly of the lenses 3a and 3b. Designated by 5a and 5b are stops provided near the secondary imaging lenses. The field lens 2 substantially, images the exit pupil of the imaging optical system 1 on the pupil planes of the two secondary imaging lenses 3a and 3b. As a result, light beams to be incident on the secondary imaging lenses 3a and 3b respectively are those emergent from two areas of equal dimensions, which never overlap each other and which correspond to the secondary imaging lenses 3a and 3b, on the exit pupil plane of the imaging optical system 1. When object images as the aerial images formed near the field lens 2 are re-imaged on the surfaces of the photoelectric conversion element arrays 4a and 4b by the secondary imaging lenses 3a and 3b, the positions of the two re-imaged object images are variable in accordance with the changes in the poistion along the direction of the optical axis whereat each object image is formed. FIGS. 2A-2C of the accompanying drawings show the manner in which such phenomenon occurs. In each of the near-focus state and the far-focus state shown in FIGS. 2B and 2C, respectively, relative to the in-focus state of FIG. 2A, the two object images formed on the surfaces of the photoelectric conversion element arrays 4a and 4b are displaced in opposite directions on the surfaces of the photoelectric conversion element arrays 4a and 4b and become deviated from each other. If the intensity distribution of each object image is photoelectrically converted and the relative positional deviation of the two object images is detected by the use of an electrical processing circuit, the state of focus can be discriminated.

Figure 3:
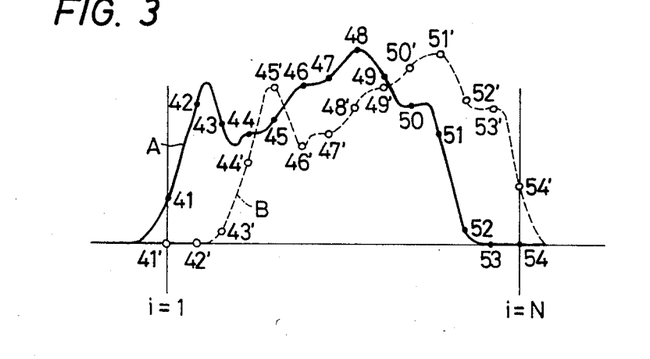
FIG. 3 shows the output characteristics of two object images positionally deviated relative to each other.

As a method of processing the photoelectrically converted signal, for example, Japanese Laid-open Patent Application No. 87222/1979 corresponding to U.S. Pat. No. 4,230,401 and U.S. Pat. No. 4,250,376 are known. When the received light signals obtained by photoelectrically converting the object images, as the two secondary images, are denoted by a(i) and b(i) (i=1 through N), respectively, $$V = \sum_{i=1}^{N-k} |a(i) - b(i+k)| - \sum_{i=1}^{N-k} |a(i+k) - b(i)| \quad (1)$$

is calculated either by an analog processing circuit or digitally with respect to a suitable constant k in the aforementioned known examples, and the direction of displacement of the imaging optical system 1 to be executed is determined by the positive or the negative of the valve of this V. In this case, the value of k is usually selected to k=1. In FIG. 3 of the accompanying drawings, characteristics A and B shown the light intensity distributions of the two positionally deviated object images to be photoelectrically converted. In FIG. 3, the abscissa represents the lengthwise direction of the photoelectric conversion element array and the ordinate represents the output values of the elements. The sets of points such as 41 and 41', 42 and 42', and so on represent that they are the output signal values of the corresponding element pairs of the photoelectric conversion element arrays 4a and 4b and, for example, in case k=1, the first term of equation (1) has the correspondence relation between the sets such as 41 and 42', 42 and 43', and so on and is the result of the addition of the absolute values of the differences between the signal values from the respective elements. Accordingly, this signal processing method is nothing but to find an area corresponding to the difference between characteristics A and B obtained from the two object images and to discriminate in which direction of the displacement of the lens this area portion concentrates more.

However, the above-described operation makes it necessary to find the absolute values and suffers from the disadvantage that the electric circuit for realizing this becomes complex. Also, subtractions, between the outputs of the individual element pairs are carried out and therefore, the errors of the output values are accumulated and the accuracy of the operation becomes a problem.

Also, in the operation processing method based on equation (1), the direction in which the imaging optical system 1 is to be displaced is merely discriminated. Therefore, in a focus detecting system wherein the state of focus is discriminated from the amount of deviation of two object images, a method is known which uses the relation that the amount of deviation and the amount of defocus of the two object images are substantially proportional to each other, to displace one object image relative to the other object image, thereby calculating the amount of displacement of the imaging optical system 1. This method has already been proposed with respect to the base-length range finder type focus detecting system. Also, the reduced cost of semiconductor integration elements has made it possible to process a considerable amount of information within a camera and thus, several operation processing methods using the above-described principle have been proposed with respect also to the TTL (Through-The-Lens) type focus detecting system which requires high accuracy. For example, in Japanese Laid-open Patent Application Nos. 75607/1981 and 45510/1982, corresponding respectively to U.S. Pat. Nos. 4,387,975 and 4,333,007, the object image represented by b(i) is changed in position relative to the object image represented by a(i) and as the degree of correlation representative of the degree of coincidence between the two object images, V of equation (1) is calculated by the circuit processing. That is, $$V(m) = \sum_i |a(i) - b(i + l - m)| - \sum_i |a(i + l) - b(i - m)| \quad (2)$$

Figure 4:
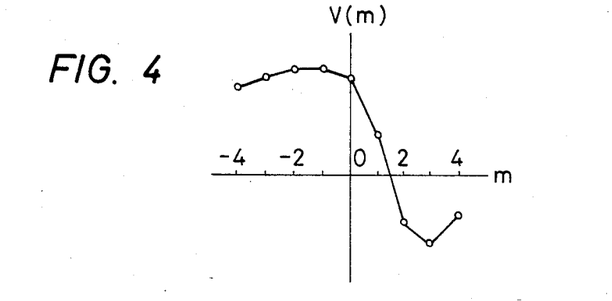
FIG. 4 shows the characteristic of the operation output value according to the prior art.
Figure 5:
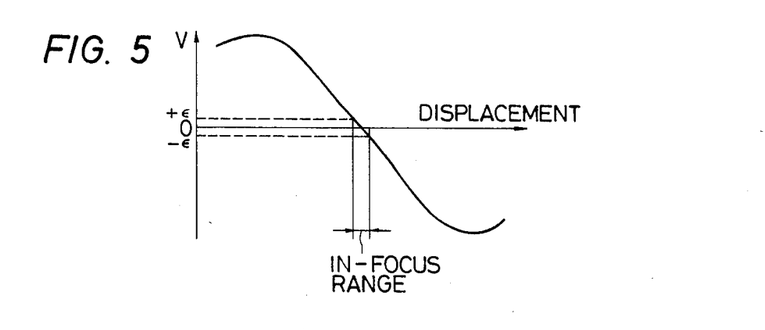
FIG. 5 illustrates a focus signal.

The amount of relative displacement m having V(m) set is repetitively calculated with respect to each integer value of the range $m_1 \leq m \leq m_2$. A graph in which the value of V(m) has been plotted relative to m is as shown in FIG. 4. When the two object images have become coincident with each other, V(m) should be 0 and thus, in FIG. 4, there is an amount of deviation of the images corresponding to 1.5 picture cell.

However, the non-linear processing of absolute value operation is included in equation (2) and this appears as an increase in operation step in the digital processing using a microcomputer or the like. Also, overlap of noise components occurs in such operation process taking the difference between two signals and this causes reduction in noise-resistant property.

SUMMARY OF THE INVENTION

It is an object of the present invention to provide a focus detecting system which uses two object images formed by dividing the exit pupil of an imaging optical system and which utilizes a novel and simple signal processing process of good accuracy, as compared with the prior art.

It is a further object of the present invention to provide a focus detecting system which includes only a linear operation in the signal processing and can determine the amount of displacement of the imaging optical system to be executed, namely, the amount of deviation of the focus, easily and with high accuracy.

In accordance with the present invention, in a case where the exit pupil of a main imaging optical system whose focus is to be detected is divided and a plurality of object images formed by imaging light beams emergent from the divided exit pupil areas are electrically detected by photoelectric conversion element arrays to thereby discriminate the state of focus, the plurality of photoelectric conversion element arrays receiving the respective object images are caused to correspond to one another by a predetermined correspondence relation, the photoelectric outputs of the corresponding elements are compared, and an operational processing in which the minimum or maximum output value thereof is extracted and integrated is carried out to obtain a focusing state discriminating signal. Further, the gist of the present invention resides in that while the predetermined correspondence relation is being varied, the smaller or greater output value thereof is linearly extracted and integrated and the amount of deviation relative to the in-focus state is calculated from this correspondence relation.

The invention will become more fully apparent from the following detailed description thereof taken in conjunction with the accompanying drawings.

DESCRIPTION OF THE PREFERRED EMBODIMENTS

First, as an embodiment of the signal processing operation in the focus detecting system of the present invention, description will be made of a focus detecting method for finding the focusing state discriminating signal V by the use of the following equation:

$$V = \sum_{i=1}^{N-k} \min\{a(i), b(i + k)\} - \sum_{i=1}^{N-k} \min\{a(i + k), b(i)\} \quad (3)$$

wherein a(i) and b(i) of equation (3) are photoelectric output signals a(i) and b(i), respectively (i=1 through N), and are positive value signals obtained from first and second photoelectric conversion element arrays, respectively, and min{x, y} indicates the extraction of smaller one of two positive real numbers x and y. The characteristics A and B of FIG. 3 represent the light intensity distributions of two secondary images, i.e., a(i) and b(i) (i=1 through N), and it is to be understood that the output signals are from 41, 41′ to 54, 54′ of FIG. 3. Assuming that the output signal of point 41 is represented as A(41) and the output signal of point 41′ is represented as B(41′), the first term $V_1$ of equation (3) is $$V_1 = \min\{A(41), B(42')\} + \min\{A(42), B(43')\} + \min\{A(43), B(44')\} + \ldots + \min\{A(53), B(54')\} \quad (4)$$

and if this is specifically applied to the output signal of FIG. 3, $$V_1 = B(42') + B(43') + \ldots + A(52) + A(53) \quad (5)$$

If the second term $V_2$ of equation (3) is likewise found, $V = V_1 - V_2$ is positive in FIG. 3 and this shows that the imaging optical system is not in the in-focus state. Each term of equation (3) seeks after a portion commonly encircled with the characteristics A and B somewhat shifted, and the smaller becomes V, the nearer the in-focus state becomes the imaging optical system. If the imaging optical system 1 is driven in a predetermined direction in accordance with the positive or negative sign of V after this operation has been carried out, the imaging optical system 1 can be brought close to the in-focus state. During the in-focus, V should be V=0 and practically, an in-focus determining reference width ε may be set up and the in-focus may be judged when the absolute value of V is smaller than ε. FIG. 4 shows the manner in which the value of V is varied with the displacement of the imaging optical system 1.

Figure 6:
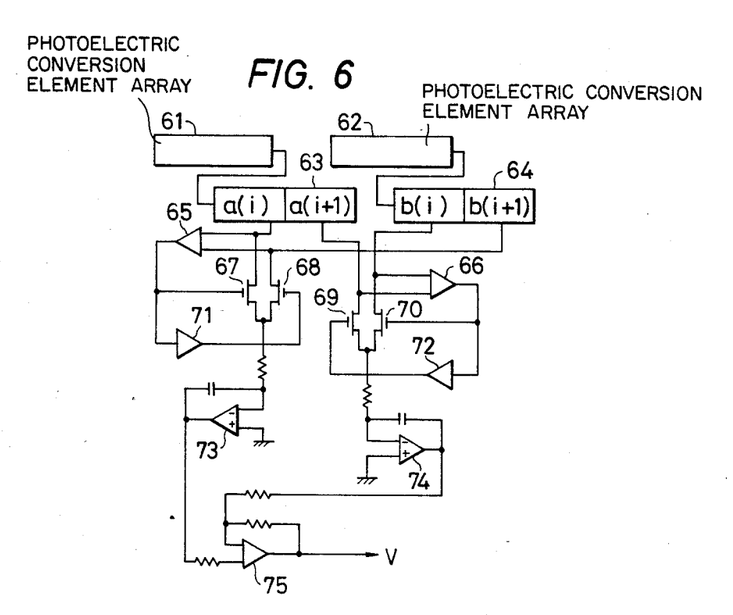
FIG. 6 shows the construction of a circuit of an embodiment which realizes the system of the present invention.

Referring to FIG. 6 which shows an embodiment in which such operation is carried out by an analog operational circuit, reference numerals 61 and 62 designate photoelectric conversion element arrays which receive the object images as the secondary images. The light-reception signals put out as time-serial signals from these arrays pass through two-stage analog shift registers 63 and 64. The photoelectric conversion element arrays 61 and 62 need not be arranged in two physically spaced apart series, but a row of arrays may be partly divided and used. These electronic members are synchronously controlled by a clock generating circuit, not shown. The shift registers 63 and 64 hold therein signals a(i), a(i+1) and signals b(i), b(i+1), respectively, and are respectively, connected to a comparator 65 for determining min{a(i), b(i+1)} of equation (3) and a comparator 66 for determining min{a(i+1), b(i)} of equation (3). The comparator 65 and a NOT gate 71 putting out the inverted output thereof exclusively control analog switches 67 and 68 and put out min{a(i), b(i+1)} to an integrator 73. Likewise, the comparator 66 and its inverted output gate 72 exclusively control analog switches 69 and 70 and put out min{a(i+1), b(i)} to an integrator 74. The outputs of the integrators 73 and 74 are directed to a differential amplifier 75, from which is put out the focusing state discriminating signal V.

The focus detecting and processing circuit of FIG. 6 does not at all require non-linear operation processes such as multiplication, division, absolute values, etc. and therefore can be easily realized by an analog operational circuit. Of course, where a digital operational circuit is used, it is also a great advantage that the non-linear processes are not required.

Another embodiment of the present invention will now be described. In this embodiment, $$V = \sum_{i=1}^{N-k} \max\{a(i), b(i + k)\} - \sum_{i=1}^{N-k} \max\{a(i + k), b(i)\} \qquad (6)$$

is calculated. Max{x, y} indicates the greater one of two positive real numbers x and y, and the other symbols are similar to those described in connection with the previous embodiment. In the previous embodiments, the smallest one of the characteristics A and B is selected and the area portion encircled commonly by the two characteristics is sought after, whereas in the present embodiment, the area portion including all the characteristics A and B is extracted and calculated. Where the operational equation (6) is used, the value of the focusing state discriminating signal V for the displaced position of the imaging optical system is reversed in its sign with respect to the previous embodiment. Accordingly, the driving direction of the imaging optical system predetermined by the positive or the negative of V is opposite to that in the previous embodiment. In the circuit, the operation processes are realized by changing the connections between the outputs of the comparators 65, 66 and of the NOT gates 71, 72 producing the inverted outputs thereof and the analog switches 67, 68, 69, 70, in FIG. 6.

The signal processing operation of the present invention by which the amount of deviation of two object images is found and the amount of defocus of the imaging optical system is found will now be shown.

Figure 7A:
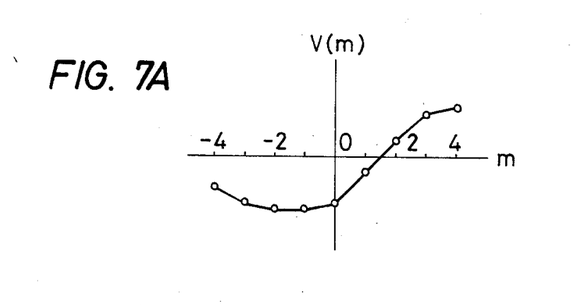
FIGS. 7A and 7B show operation output characteristics.
Figure 7B:
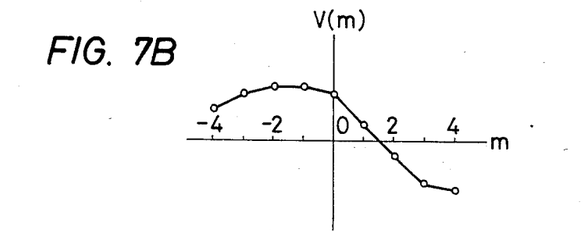

The embodiment of the present invention adopts, as a correlated value calculating method in which operation is effected while one object image is being displaced relative to the other object image, an operation process in which, as shown in equations (2) and (5), the intensity distribution information a(i) and b(i) of two object images are caused to correspond to each other on the basis of a predetermined relative relation and the magnitudes of the sets {a(j₁), b(j₂)} of the two values thus caused to correspond to each other are compared, whereby only one of them is selected and added. For example, where equation (3) is used, $$V(m) = \sum_{i} \min\{a(i), b(i + k - m)\} - \sum_{i} \min\{a(i + k), b(i - m)\} \qquad (7)$$

is calculated with respect to different m, and where equation (6) is used, $$V(m) = \sum_{i} \max\{a(i), b(i + k - m)\} - \sum_{i} \max\{a(i + k), b(i - m)\} \qquad (8)$$

is calculated with respect to different m. The range of i in which the sum is taken is determined from the condition that each suffix i, i+k−m, 1+k, i−m must be within the closed section [1, N]. A graph in which the V(m) calculated by equation (7) is plotted relative to m is shown in FIG. 7A, and a graph in which the V(m) calculated by equation (8) is plotted relative to m is shown in FIG. 7B.

According to the present embodiment, use is not made of a non-linear operation including absolute values or the like and therefore, the signal processing circuit can be simply constructed and the number of program steps during digital processing is reduced and moreover, accumulation of errors is small as compared with the prior art and the operation accuracy is improved.

In FIGS. 7A and 7B, the m for which V(m) is 0 creates not an integral value but a fraction, and by using a suitable interpolation for this, a detailed value can be found. The simplest interpolation, in this case, is a linear interpolation and assuming that there has been an inversion of sign between V(m₀) and V(m₀+1), the amount of image deviation M₀ including a fraction can be calculated by $$M_0 = m_0 + |V(m_0)/\{V(m_0+1) - V(m_0)\}|.$$

The following embodiment of the present invention is also possible. That is, as the degree of correlation representing the degree of coincidence between two object images, use may be made of $$V = \sum_{i=1}^{N} \min\{a(i), b(i)\} \qquad (9)$$

or

-continued $$V = \sum_{i=1}^{N} \max\{a(i), b(i)\} \quad (10)$$

Figure 8A:
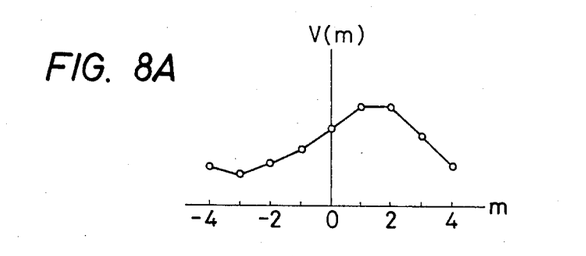
FIGS. 8A and 8B show the operation output characteristics according to another embodiment of the present invention.
Figure 8B:
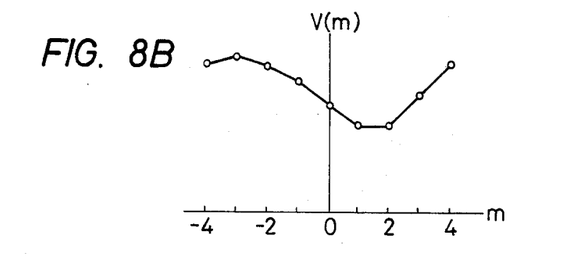

To effect calculations in these equations (9) and (10) while displacing one image relative to the other image, the V(m) defined by $$V(m) = \sum_{i} \min\{a(i), b(i-m)\} \quad (11)$$

where equation (9) is used, and the V(m) defined by $$V(m) = \sum_{i} \max\{a(i), b(i-m)\} \quad (12)$$

where equation (10) is used, may be calculated. A graph in which the V(m) of equation (11) is plotted relative to the amount of relative displacement m is shown in FIG. 8A, and a graph in which the V(m) of equation (12) is plotted relative to m is shown in FIG. 8B. Generally, the V(m) of equation (11) becomes maximum during the in-focus in which two object images are coincident, and the V(m) of equation (12) becomes minimum during the in-focus. Again in the present embodiment, the m corresponding to the extremal value point usually is not an integer and therefore, to find a detailed value including the unit, an interpolation operation is necessary. The interpolation by a secondary function is useful as the simplest interpolation in this case.

The method according to the present invention is not restricted to the so-called TTL type focus detecting system in which two object images to be operation-processed are formed by the light rays passed through the imaging optical system. As a matter of course, it is also applicable to a focus detecting system such as a base-length type focus detecting device which uses the deviation of two object images or to a distance detecting system.

As described above, the focus detecting system according to the present invention, as the focus detection signal processing method using the deviation of two object images, compares the magnitudes of two photoelectric conversion outputs caused to correspond to each other and selects and adds one of the two output values on the basis of the result of the comparison. Accordingly, the system according to the present invention comprises only a linear operation and is quick in operation and easy to construct and yet has accuracy not inferior to that of the prior art and has an advantage that accumulation of errors is small.

What I claim is:

1. A focus detecting system comprising:
an imaging optical system having an exit pupil;
an auxiliary optical system disposed rearwardly of said imaging optical system, said auxiliary optical system forming a plurality of intensity distributions regarding an object by light beams passed through a plurality of different portions of the exit pupil of said imaging optical system;
photoelectric conversion element arrays each comprising a plurality of elements and disposed at locations whereat said plurality of intensity distributions are formed, said photoelectric conversion element arrays putting out electrical signals corresponding to said intensity distributions, each of the elements of the first one of said photoelectric conversion element arrays having a first and a second correspondence relation with each of the elements of the second one of said photoelectric conversion element arrays;
signal processing operation means comparing the output signals from an element of said first photoelectric conversion element array and from an element of said second photoelectric conversion element array which are in said first correspondence relation, extracting one of the minimum and maximum of said output signals, extracting the same with respect to all elements which are in said first correspondence relation and obtaining an integrated signal value $A_1$, said signal processing operation means comparing the output signals from an element of said first photoelectric conversion element array and from an element of said second photoelectric conversion element array which are in said second correspondence relation, extracting one of the minimum and maximum of said output signals, extracting one of the minimum and maximum output signals with respect to all elements which are in said second correspondence relation and obtaining an integrated signal $A_2$, said signal processing operation means calculating and finding a signal value A from said signal values $A_1$ and $A_2$ by an equation $A = A_1 - A_2$; and
focusing state discriminating means for discriminating the state of focus of said imaging optical system by the use of said signal value A.

2. A focus detecting system according to claim 1, wherein the number of elements of said first photoelectric conversion element array is the same as the number of elements of said second photoelectric conversion element array.

3. A focus detecting system according to claim 2, wherein the first and second correspondence relations between each element of said first photoelectric conversion element array and each element of said second photoelectric conversion element array are such that the elements of said two photoelectric conversion element arrays are shifted by an amount corresponding to at least one element.

4. A focus detecting system according to claim 1, wherein said auxiliary optical system is disposed near the image plane of said imaging optical system and has a plurality of lenses, at least two photoelectric conversion elements are disposed rearwardly of said lenses, one of said at least two photoelectric conversion elements is a part of said first photoelectric conversion element array and the other of said at least two photoelectric conversion elements is a part of said second photoelectric conversion element array.

5. A focus detection method for system comprising:
an imaging optical system having an exit pupil;
an auxiliary optical system disposed rearwardly of said imaging optical system, said auxiliary optical system forming a plurality of intensity distribution regarding an object by light beams passed through a plurality of different portions of the exit pupil of said imaging optical system; and
photoelectric conversion element arrays each comprising a plurality of elements and disposed at locations whereat said plurality of intensity distributions are formed, said photoelectric conversion element arrays putting out electrical signals corresponding to said intensity distributions,
said method comprising the steps:

causing each of the elements of the first one of said photoelectric conversion element arrays to have a first and a second correspondence relation with each of the elements of the second one of said photoelectric conversion element arrays;

comparing the output signals from an element of said first photoelectric conversion element array and from an element of said second photoelectric conversion element array which are in said first correspondence relation;

extracting one of the minimum and maximum of said output signals;

extracting one of the minimum and maximum signal with respect to all elements which are in said first correspondence relation;

obtaining an integrated signal value $A_1$;

comparing the output signals from an element of said first photoelectric conversion element array and from an element of said second photoelectric conversion element array which are in said second correspondence relation;

extracting one of the minimum and maximum of said output signals;

extracting one of the minimum and maximum signals with respect to all elements which are in said second correspondence relation and obtaining an integrated signal value $A_2$;

calculating and finding a signal value A from said signal values $A_1$ and $A_2$ by an equation $A = A_1 - A_2$;

successively varying the first and second correspondence relations between said first and second photoelectric conversion element arrays and obtaining a signal value group B of the signal value A of a number corresponding to the number of variations; and calculating the amount of defocus of said imaging optical system by the use of said signal value group B.

6. A focus detecting system comprising:

an imaging optical system having an exit pupil;

an auxiliary optical system disposed rearwardly of said imaging optical system and having an entrance pupil, said auxiliary optical system forming a plurality of intensity distribution regarding an object by light beams passed through a plurality of different portions of the exit pupil of said imaging optical system;

photoelectric conversion element arrays each comprising a plurality of elements and disposed at locations whereat said plurality of intensity distributions are formed, said photoelectric conversion element arrays putting out electrical signals corresponding to said intensity distributions, each of the elements of the first one of said photoelectric conversion element arrays having a first and a second correspondence relation with each of the elements of the second one of said photoelectric conversion element arrays;

signal processing operation means comparing the output signals from an element of said first photoelectric conversion element array and from an element of said second photoelectric conversion element array which are in said first correspondence relation, extracting one of the minimum and maximum of said output signals, extracting the same with respect to all elements which are in said first correspondence relation and obtaining an integrated signal value $A_1$, said signal processing operation means comparing the output signals from an element of said first photoelectric conversion element array and from an element of said second photoelectric conversion element array which are in said second correspondence relation, extracting one of the minimum and maximum of said output signals, extracting the same with respect to all elements which are in said second correspondence relation and obtaining an integrated signal value $A_2$, said signal processing operation means calculating and finding a signal value A from said signal values $A_1$ and $A_2$ by an equation $A = A_1 - A_2$, said signal processing operation means successively varying the first and second correspondence relations between said first and second photoelectric conversion element arrays and obtaining a signal value group B of the signal value A of a number corresponding to the number of variations; and focusing state discriminating means for calculating the amount of defocus of said imaging optical system by the use of said signal value group B.

7. A focus detecting system according to claim 6, wherein the number of elements of said first photoelectric conversion element array is the same as the number of elements of said second photoelectric conversion element array.

8. A focus detecting system according to claim 6, further comprising a field lens disposed near the imaging plane of said imaging optical system, said field lens imaging the entrance pupil of said auxiliary optical system near the exit pupil of said imaging optical system.

9. A focus detecting system according to claim 6, wherein said auxiliary optical system is disposed near the image plane of said imaging optical system and has a plurality of lenses, at least two photoelectric conversion elements are disposed rearwardly of said lenses, one of said at least two photoelectric conversion elements is a part of said first photoelectric conversion element array and the other of said at least two photoelectric conversion elements is a part of said second photoelectric conversion element array.

10. A focus detecting system according to claim 6, wherein when electrical signals put out from the respective elements of said first and second photoelectric conversion element arrays are $a_1, a_2, a_3, \ldots a_i \ldots, a_N$ and $b_1, b_2, b_3, \ldots b_i \ldots, b_N$, said first correspondence relation is $a_i$ and $b_{i+k-m}$ and said second correspondence relation is $a_{i+k}$ and $b_{i-m}$, where i is a suffix indicative of the number of each element of said photoelectric conversion element arrays, m is an amount of relation displacement, and k is a parameter corresponding to the variation in the correspondence relation.

11. A focus detecting system comprising:

an imaging optical system having an exit pupil;

an auxiliary optical system disposed rearwardly of said imaging optical system, said auxiliary optical system forming a plurality of intensity distributions regarding an object by light beams passed through a plurality of different portions of the exit pupil of said imaging optical system;

photoelectric conversion element arrays each comprising a plurality of elements and disposed at locations whereat said plurality of intensity distributions are formed, said photoelectric conversion element arrays putting out electrical signals corresponding to the distribution states of said intensity distributions, each of the elements of the first one of said photoelectric conversion element arrays having a predetermined correspondence relation with each of the elements of the second one of said photoelectric conversion element arrays;

signal processing operation means comparing the output signals from an element of said first photoelectric conversion element array and from an element of said second photoelectric conversion element array which are in said predetermined correspondence relation, extracting one of the minimum and maximum of said output signals, extracting the same with respect to all elements which are in said predetermined correspondence relation and obtaining an integrated signal value A, said signal processing operation means successively varying the predetermined correspondence relation between said first and second photoelectric conversion element arrays and obtaining a signal value group B of the signal value A of a number corresponding to the number of variations; and focusing state discriminating means for calculating the amount of defocus of said imaging optical system by the use of said signal value group B.

12. A focus detecting system according to claim 11, wherein when electrical signals put out from the respective elements of said first and second photoelectric conversion element arrays are $a_1, a_2, a_3, \ldots a_i \ldots, a_N$ and $b_1, b_2, b_3, \ldots b_i \ldots, b_N$, said correspondence relation is $a_i$ and $b_{i-m}$, where i is a suffix indicative of the number of each element of said photoelectric conversion element arrays, and k is a parameter corresponding to the variation in the correspondence relation.

13. A focus detection method for system comprising:
an imaging optical system having an exit pupil;
an auxiliary optical system disposed rearwardly of said imaging optical system, said auxiliary optical system forming a plurality of intensity distributions regarding an object by light beams passed through a plurality of different portions of the exit pupil of said imaging optical system; and photoelectric conversion element arrays each comprising a plurality of elements and disposed at locations whereat said plurality of intensity distributions are formed, said photoelectric conversion element arrays putting out electrical signals corresponding to said intensity distributions, said method comprising the steps:

causing each of the elements of the first one of said photoelectric conversion element arrays to have predetermined correspondence relation with each of the elements of the second one of said photoelectric conversion element arrays;

comparing the output signals from an element of said first photoelectric conversion element array and from an element of said second photoelectric conversion element array which are in said predetermined correspondence relation;

extracting one of the minimum and maximum of said output signals;

extracting one of the minimum and maximum signals with respect to all elements which are in said predetermined correspondence relation;

obtaining an integrated signal value A;

successively varying the predetermined correspondence relation between said first and second photoelectric conversion element arrays and obtaining a signal value group B of the signal value A of a number corresponding to the number of variations; and calculating the amount of defocus of said imaging optical system by the use of said signal value group B.

* * * * *